United States Patent [19]
Fulford

[11] Patent Number: 6,066,222
[45] Date of Patent: May 23, 2000

[54] PROCESSES FOR MANUFACTURE OF COMPOSITE WOODEN AND FOAM ASSEMBLY

[76] Inventor: Mark Fulford, 1424 - 238th Ave. SE., Issaquah, Wash. 98029

[21] Appl. No.: 08/974,748

[22] Filed: Nov. 19, 1997

Related U.S. Application Data

[63] Continuation of application No. 08/726,339, Oct. 3, 1996, abandoned, which is a continuation-in-part of application No. 08/437,717, May 9, 1995, abandoned, which is a continuation-in-part of application No. 08/335,438, Nov. 7, 1994, abandoned, which is a division of application No. 08/074,028, Jun. 4, 1993, Pat. No. 5,361,552, which is a division of application No. 07/893,760, Jun. 5, 1992, Pat. No. 5,218,807.

[51] Int. Cl.$^7$ ................................................. B32B 31/06
[52] U.S. Cl. .................. 156/154; 156/182; 156/258; 156/260; 156/263; 156/264
[58] Field of Search ..................................... 156/154, 182, 156/258, 260, 263, 264, 292; 428/316.6, 318.4

[56] References Cited

U.S. PATENT DOCUMENTS

| | | | |
|---|---|---|---|
| 2,086,571 | 7/1937 | Novambere | 52/793.11 |
| 2,103,003 | 12/1937 | Fischer | 428/316.6 |
| 3,676,279 | 7/1972 | Beaver | 52/792.11 |
| 3,773,604 | 11/1973 | Desai et al. | 428/316.6 |
| 3,906,137 | 9/1975 | Bauer | 428/316.6 |
| 4,119,750 | 10/1978 | Porter | 428/316.6 |
| 4,726,973 | 2/1988 | Thompson | 428/316.6 |
| 5,034,259 | 7/1991 | Barker | 144/351 |
| 5,074,092 | 12/1991 | Norlander | 428/50 |
| 5,081,810 | 1/1992 | Emmert | 52/794.1 |

OTHER PUBLICATIONS

Chilton's Guide to Home Energy Savings, Vaughn, 1982, pp. 166, 167, 170, 171.

*Primary Examiner*—Sam Chuan Yao
*Attorney, Agent, or Firm*—James R. Vance

[57] ABSTRACT

Composite products and processes for the manufacture thereof, including, but not limited to composite products that could feasibly replace nearly all decorative and/or structural lumber products.

24 Claims, 9 Drawing Sheets

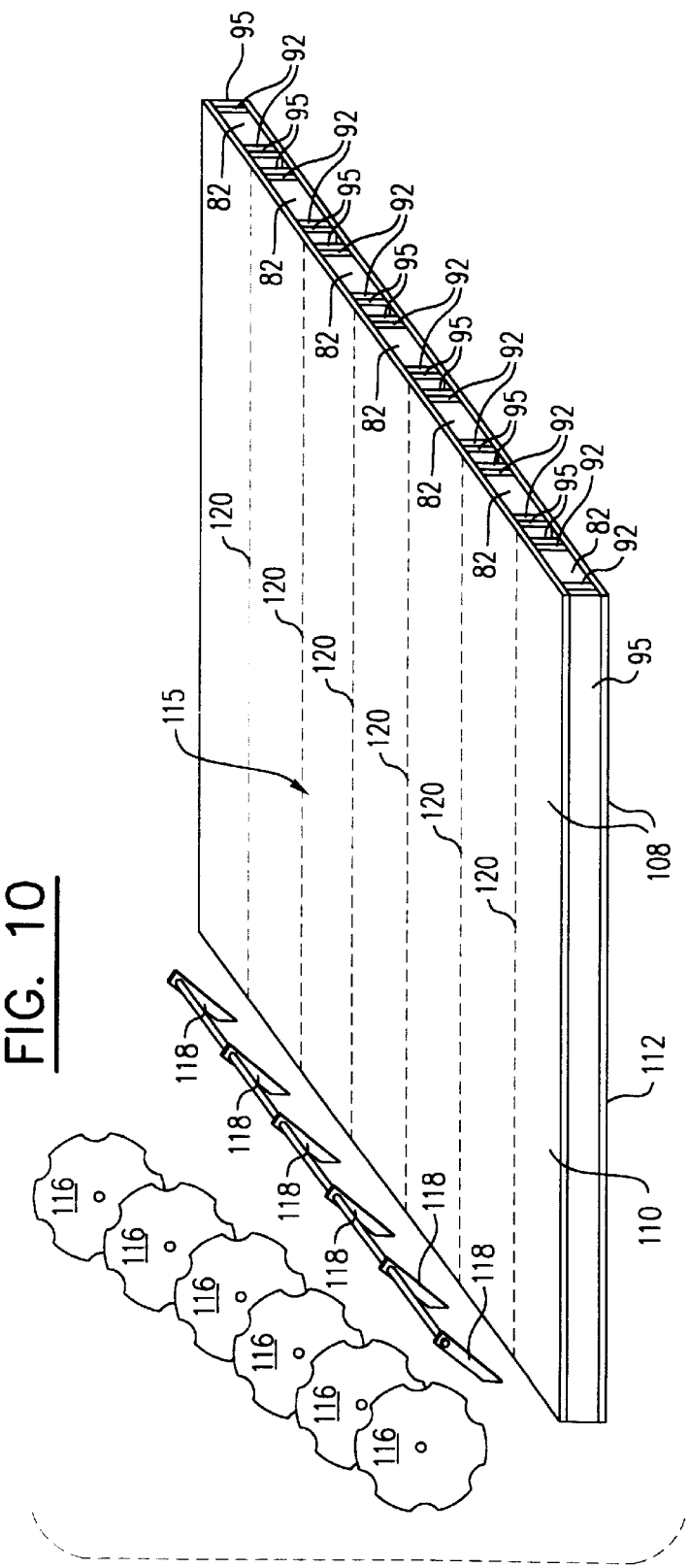
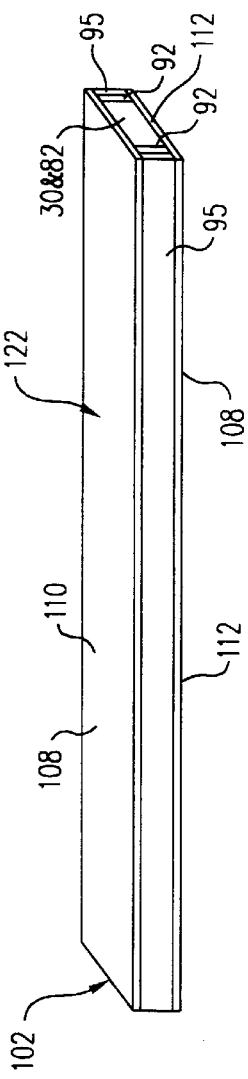

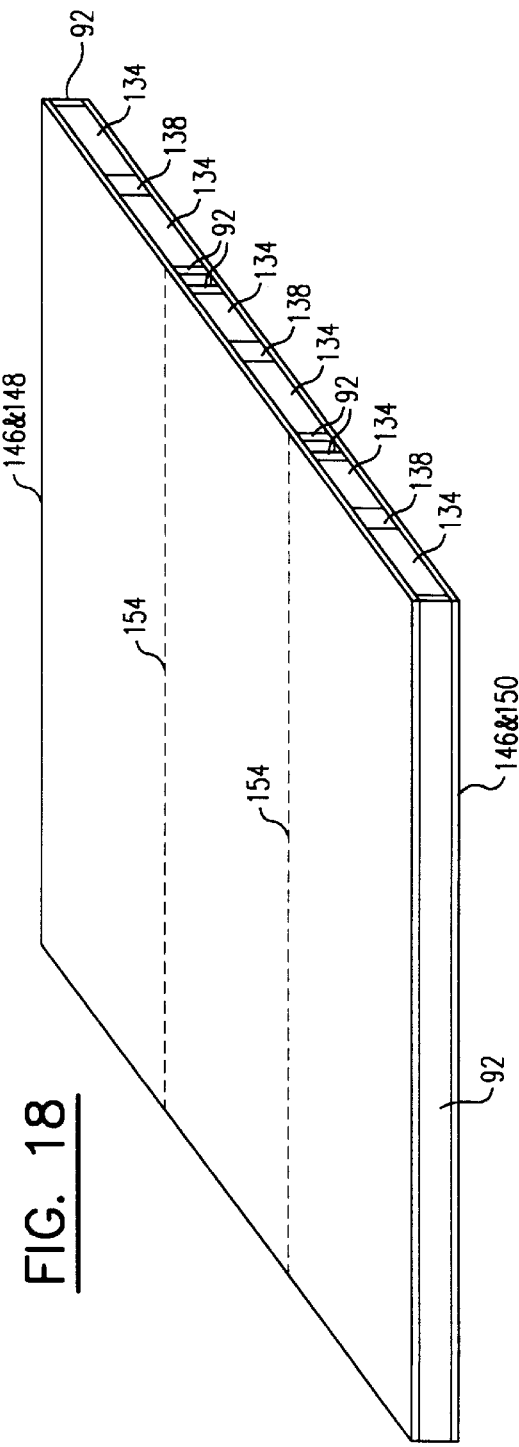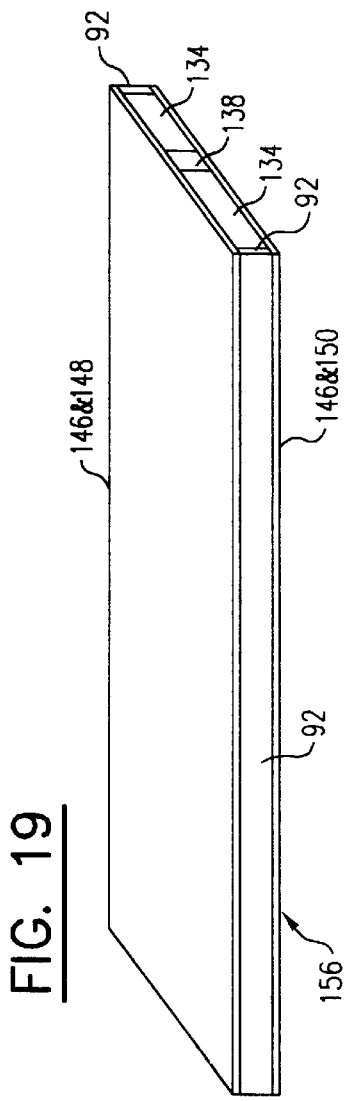

PROCESSES FOR MANUFACTURE OF COMPOSITE WOODEN AND FOAM ASSEMBLY

This application is a continuation of copending application Ser. No. 08/726,339 filed on Oct. 3, 1996.

This application Ser. No. 08/974,748, titled PROCESSES FOR MANUFACTURE OF COMPOSITE WOODEN AND FOAM ASSEMBLY, which was filed in the United States Patent and Trademark Office on Nov. 19, 1997, is a file-wrapper-continuing (FWC) application of an earlier, commonly owned, copending, now abandoned U.S. utility patent application titled COMPOSITE PRODUCTS AND PROCESSES FOR MANUFACTURE THEREOF, Ser. No. 08/726,339, which was filed in the United States Patent and Trademark Office on Oct. 3, 1996. That patent application was a file-wrapper-continuing (FWC) application of an earlier, commonly owned, copending, now abandoned U.S. utility patent application titled COMPOSITE PRODUCTS AND PROCESSES FOR MANUFACTURE THEREOF, Ser. No. 08/437,717, which was filed in the United States Patent and Trademark Office on May 9, 1995. That patent application was a continuation-in-part (CIP) application of a commonly owned, copending U.S. utility patent application, titled WOODEN DOOR ASSEMBLY AND DOOR JAMB ASSEMBLY HAVING AN INSULATIVE FOAM CORE, Ser. No. 08/335,438, which was filed in the United States Patent and Trademark Office on Nov. 7, 1994. That patent application was a divisional application of an earlier, commonly owned, copending U.S. utility patent application, titled WOODEN DOOR ASSEMBLY AND DOOR JAMB ASSEMBLY HAVING AN INSULATIVE FOAM CORE, Ser. No. 08/074,028, which was filed in the United States Patent and Trademark Office on Jun. 4, 1993, and is now U.S. Pat. No. 5,361,552, which issued on Nov. 8, 1994. That patent application was a divisional application of an earlier, commonly owned, copending U.S. utility patent application, titled WOODEN DOOR ASSEMBLY AND DOOR JAMB ASSEMBLY HAVING AN INSULATIVE FOAM CORE, Ser. No. 07/893,760, which was filed in the United States Patent and Trademark Office on Jun. 5, 1992, and is now U.S. Pat. No. 5,218,807, which issued on Jun. 15, 1993.

COPYRIGHT NOTICE

© Copyright 1995, James R. Vance. All Rights Reserved.

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

This invention relates to composite products and processes for the manufacture thereof. By way of example, but not by way of limitation, such composite products could feasibly replace nearly all decorative and/or structural lumber products.

BACKGROUND ART

For centuries, even millenniums, solid wood products have been used to manufacture and construct homes, doors, door jambs, window frames, window jambs, cabinetry, furniture, decks, fences, and the like. The persistence in using solid wood as a fundamental decorative and structural mainstay to create and decorate such products has been primarily based upon a devotion to traditional construction and manufacturing procedures, a relatively low cost for wood, and an abundance of resources.

Within the annals of history, it has only been recently that a need for alternative lumber products has been acknowledged. For example, the last few generations have seen the advent of plywood having multiple layers of thin shaved wood fibers that are pressed into a bi-directional sheeting or sheathing. We have also seen the introduction of pressboard, Timberstrand, and the increasing use of cardboard.

It has only been within the last two decades that the government, industry, and public have been informed of a need to conserve the forests and particularly the rain forests. The reasons given for conserving such forests include protecting the earth's ozone layer, maintaining a genetic pool of plant life that may be important for future medical advances, and protecting endangered species.

Irrespective of the validity or invalidity of the current positions promoted by many naturalists and scientists, it has become clear that indiscriminate removal of trees is a thing of the past.

Industries that rely heavily upon the supply and use of solid wood products are finding that such resources are becoming increasingly scarce and much more costly.

Heretofore, exterior and interior residential doors were typically manufactured from solid wood planks that were milled to form solid wood stiles, rails, and panels. The stiles, rails, and panels were then fitted and secured to each other to form a paneled or flush door.

However, the production of solid and milled wood doors requires the stockpiling and use of a large quantity of very expensive, high-quality wood. With the depletion of the world's old-growth forests, such high-quality wood is becoming prohibitively expensive and difficult to acquire and store. In addition, such doors do not provide an effective insulative barrier.

When manufacturing patio doors, one or more of the milled panels that would otherwise be used in a traditional door are replace with sheets of heavy, thick glass. The use of such glass does not alleviate the practice of using solid wood planking or dimensional lumber to support the glass and form the general framework of the door. It should be remembered, however, that the use or placement of glass within a door significantly decreases the energy efficiency of the door.

Due to the foregoing reasons, economic reality is forcing many companies and whole industries to look for alternative sources of decorative and/or structural materials. For example, several companies are now manufacturing doors and windows that have aluminum and/or vinyl frames and/or skins. The exterior plastic or metal skin on these doors is actually overlaid upon and applied to an interior framework constructed of solid wood stiles and rails. Many of such doors have a hollow interior core and are not very energy efficient.

Another variation of door structure is to encapsulate a thin sheet of batten fiberglass or foam insulating material within the otherwise hollow core. Solid wood stiles and rails are again used about the perimeter or periphery of the door. The fiberglass or foam insulating material is juxtaposed between a thin outer and inner exterior plastic or metal skin.

If the foam is injected into the hollow core, it is highly likely and probable that an air pocket or void will result wherein no foam is located. This is a very common problem with manufacturing such doors.

If a raised panel design is desired, a compression press can be used to indent both the outer skin and the insulating material to form the desired design. Although this manufacturing process produces a door having admirable energy conserving capabilities, the end product typically has a thin, stretched plastic or metal surface that is not aesthetically appealing.

Such laminated, thin skinned doors are significantly different from a traditional stainable wooden door. The perimeter of such doors reveals either sharp plastic edges or folded metal edges. Such composite doors do not have the appearance, sound, or weight that is expected of a high-quality wooden door.

Even though the amount of wood fiber used within such doors may be partially reduced, due to the use of a plastic or metal outer skin and partially injected foam central core, solid wood stiles and rails are still required.

The following disclosures relate to various types of known door structures and/or methods of manufacture thereof: Malarkey (U.S. Pat. No. 2,334,113; issued Nov. 9, 1943); Lincoln, Jr. (U.S. Pat. No. 2,791,809; issued May 14, 1957); Weyant (U.S. Pat. No. 3,286,424; issued Nov. 22, 1966); Charles (U.S. Pat. No. 3,334,464; issued Aug. 8, 1967); McGhee (U.S. Pat. No. 3,345,780; issued Oct. 10, 1967); Bainter et al. (U.S. Pat. No. 3,969,868; issued Jul. 20, 1976); Imperial et al. (U.S. Pat. No. 3,987,588; issued Oct. 26, 1976); Bursk (U.S. Pat. No. 4,034,511; issued Jul. 12, 1977); Weyant (U.S. Pat. No. 4,064,655; issued Dec. 27, 1977); Governale (U.S. Pat. No. 4,114,319; issued Sep. 19, 1978); Day et al. (U.S. Pat. No. 4,147,004; issued Apr. 3, 1979); Seely (U.S. Pat. No. 4,152,876; issued May 8, 1979); Teleskivi (U.S. Pat. No. 4,282,687; issued Aug. 11, 1981); Andresen (U.S. Pat. No. 4,294,055; issued Oct. 13, 1981); Hagemeyer (U.S. Pat. No. 4,630,420; issued Dec. 23, 1986); Tix (U.S. Pat. No. 4,726,148; issued Feb. 23, 1988); Hagemeyer (U.S. Pat. No. 4,876,838; issued Oct. 31, 1989); Green et al. (U.S. Pat. No. 4,888,918; issued Dec. 26, 1989); Strom et al. (U.S. Pat. No. 5,020,292; issued Jun. 4, 1991); and Schield et al. (U.S. Pat. No. 5,022,206; issued Jun. 11, 1991).

The inventor believes that the cited disclosures taken alone or in combination neither anticipate nor render obvious the present invention. These citations do not constitute an admission that such disclosures are relevant or material to the present claims. Rather, the foregoing citations relate only to the general field of the disclosure and are cited as constituting the closest art of which the inventor is aware.

DISCLOSURE OF INVENTION

The present invention is specifically designed to permit nearly continuous, efficient, cost effective, mass production of composite products. Such composite products are: relatively light in overall weight; require the use of a minimal amount of interior stock segments; maximize the use of inexpensive insulative foam segments; have a dramatically increased insulative efficiency that was heretofore unavailable; maintain adequate structural integrity and strength; and significantly reduces the amount of high-quality wood fiber needed to produce an attractive, stainable or paintable product that can replace traditional dimensional lumber and can be used in the construction of homes, doors, door jambs, window frames, window jambs, cabinetry, furniture, decks, fences, and the like.

The present invention not only accomplishes the foregoing and below mentioned objectives but also overcomes all of the previously stated difficulties and disadvantages of the prior art.

The processes of the present invention for manufacturing composite products generally comprise the steps of: (a) obtaining a supply of appropriately dimensioned stock segments, foam segments, and sheathing material; (b) juxtaposing and joining selected stock segments and foam segments in predetermined alternating layers to form at least one composite billet; (c) applying and joining the sheathing material to opposed surfaces or sides of the composite billet; (d) cutting the composite billet generally transversely to the joint lines between the stock segments and foam segments to form at least one core stock element; and (e) applying and joining additional sheathing material to the core stock element to encapsulate the foam segments therein and thereby form the composite product.

Due to the organic nature of wood products, few, if any, substantial lengths of lumber are without knots, splits, cracks, and other structural and/or aesthetic defects. Segments that have a minimum amount of such defects are rare and can be extremely expensive.

The stock segments of the present invention, however, will be incorporated within the interior of the composite product and will not be visually exposed except for possibly small portions at each terminal end of the core stock element. Consequently, less expensive and/or engineered materials may be used to construct the stock segments. By using less expensive and/or engineered materials to construct the stock segments, the cost to manufacture the composite products can be greatly reduced.

Within one embodiment of the invention, the stock segments are simply cut from solid blocks of wood, such as from pine, spruce, or the like.

Alternatively, small segments of wood can be joined together to form a material that appears very similar to butcher block. The butcher block or stock block is then cut to form the plurality of stock segments.

Other alternatives include cutting or manufacturing the stock segments from engineered materials such as from engineered wood, plastic, concrete, fiberglass, metal, and the like. Engineered wood includes many different types of products that are known within the construction industries, including, but not limited to plywood, fiberboard, pressboard, resin impregnated paper, compressed cardboard, and the like.

If small segments of wood and/or other stock materials are used, it is preferable to first cut them to have a predetermined generally uniform thickness. These small segments of stock are juxtaposed against each other in such a manner that they are oriented to have a common uniform thickness. The segments of wood or other stock material are then joined together to form a stock block having a generally uniform thickness.

The method of joining the wood or stock materials together will largely depend upon the materials used. Within the preferred embodiment of the invention, the small segments of wood or other stock material are joined by simple gluing them together. For example a process of "end, edge, or finger gluing" may be used to accomplish this step.

The wood or stock block can be surface sanded if necessary.

The wood or stock block can then be cut to form the plurality of stock segments, each stock segment having a predetermined width, length, and common thickness.

The plurality of foam segments can simply be cut from at least one sheet or billet of foam. If a sheet of foam is used, the sheet should have a uniform, desired thickness. Each of the plurality of foam segments are thus cut to have a predetermined width, length, and common thickness.

Alternatively, each of the plurality of foam segments could be initially manufactured or formed to have the desired width, length, and thickness.

The inventor, however, has discovered that such sheets of foam typically have a different compression strength or value for their planar top and bottom surfaces as compared to their side or edge surfaces. It is important to note that the foam segments will be pivoted or reoriented during successive steps in the below described processes. Consequently, under some circumstances, it is preferable to reengineer how the foam will be initially cut.

If available, a large, thick block or billet of foam should be manufactured or ordered. The block or billet of foam is then cut transversely, perpendicularly, and/or orthogonally from what would commonly be accepted as the face of the block or billet. By so cutting the block or billet a new sheet of foam is created. However, the density of the foam on the planar face of the newly cut sheet is usually less than the density of the foam on the edge or sides of the foam sheet.

If a thick block or billet of foam is not available, one may be created by stacking and gluing or joining a plurality of sheets of foam. In essence, the faces of successive sheets of foam are glued or otherwise joined together to form a billet of foam. The stacked or layered foam billet is then cut in a direction that is generally transverse, perpendicular, and/or orthogonal to the joint lines between successive sheets of the stacked or layered foam. As the stacked or layered billet of foam is thus cut, at least one sheet of stacked or layered foam is formed. Furthermore, the stacked or layered foam sheet has a predetermined generally uniform thickness.

The newly cut sheet or stacked and layered sheet of foam can then be cut to form the plurality of foam segments, each foam segment having a predetermined width, length, and common thickness.

Within the preferred embodiment of the invention, the foam segments can be cut or manufactured from: (a) a wide variety of different products sold by Dow Chemical; (b) an extruded polystyrene insulation sold by UC Industries, Inc., under the trademark FOAMULAR 250; (c) a polyisocyanurate foam sheathing insulation board sold by Rmax, Inc., under the trade name TSA; (d) a cellular glass insulation sold by Pittsburgh Corning under the trademark FOAM-GLAS; and/or any another material that accomplishes the purposes as taught herein.

The sheathing material is applied and joined to opposed surfaces or sides of what is termed the composite billet. The composite billet will be further explained below.

The sheathing material will also be applied and joined to the core stock element to further encapsulate the foam segments and form the composite product.

The sheathing material may take many different forms. For example, the sheathing material may comprise relatively thin strips or sheets of wood, engineered wood, plastic, concrete, fiberglass, metal, and the like. Engineered wood includes many different types of products that are known within the construction industries, including, but not limited to plywood, fiberboard, pressboard, resin impregnated paper, compressed cardboard, Timberstrand, and the like.

Within the preferred embodiment of the invention, the sheathing material comprises plywood on some occasions and on other occasions a polymer cellulose product, which is a resin impregnated paper, that is sold by Weyerhaeuser Company under the trademark P-CEL.

Of course, plywood is generally sold in relatively flat sheets. P-CEL is also sold in flat sheets. However, P-CEL is also sold in large rolls similar to large rolls of news print paper. Either format may be used.

The type of adhesives used to (a) join the stock segments together, (b) join the foam segments together, (c) join the stock segments to the foam segments, (d) join the sheathing material to the composite billet, and/or (e) join the sheathing material to the core stock element, will largely depend upon the materials used. Currently the inventor is using a common industrial adhesive for the particular products that are being used at the time.

Once the necessary materials are obtained and/or prepared, selected stock segments and foam segments are juxtaposed against one another and joined to one another in predetermined alternating layers to form at least one composite billet.

For example, when preparing the composite billet to manufacture blank standard door stiles, a first stock segment having a particular width, length, and thickness is placed against a support surface. The thickness of the first stock segment extends outwardly away from the support surface.

The support surface may comprise any adequate surface, but preferably is a continuous or nearly continuous conveyor belt that also functions as a moving table top.

The preferred dimensions for each of the component parts of the composite billet to form a standard door stile will be given further below.

A first foam segment having a particular width, length, and common thickness is then placed against the support surface and is urged against the trailing end or edge of the first stock segment. The alignment of the length of the first foam segment should be generally similar to the alignment of the length of the first stock segment. In other words, they are oriented to abut against and adjoin one another.

The first stock segment is then joined to the first foam segment. The inventor prefers that such segments be adhesively jointed. However, other forms of joining such segments, such as using interlocking elements, pins, fasteners, ribs, and the like, could also be utilized.

A second stock segment having a particular width, length, and common thickness is placed against the support surface and is urged against the trailing end or edge of the first foam segment. Again, the alignment of the length of the second stock segment should be similar to the alignment of the length of the first foam segment.

The first foam segment is then joined to the second stock segment by any appropriate means.

A second foam segment having a particular width, length, and common thickness is placed against the support surface and is urged against the trailing end or edge of the second stock segment. The alignment of the length of the second foam segment is similar to the alignment of the length of the second stock segment.

The second stock segment is then joined to the second foam segment by any appropriate means.

A third stock segment having a particular width, length, and common thickness is placed against the support surface and is urged against the trailing end or edge of the second foam segment. The alignment of the length of the third stock segment is similar to the alignment of the length of the second foam segment.

The second foam segment is then joined to the third stock segment by any appropriate means.

A third foam segment having a particular width, length, and common thickness is placed against the support surface and is urged against the trailing end or edge of the third stock segment. The alignment of the length of the third foam segment is similar to the alignment of the length of the third stock segment.

The third stock segment is then joined to the third foam segment by any appropriate means.

A fourth stock segment having a particular width, length, and common thickness is placed against the support surface and is urged against the trailing end or edge of the third foam segment. The alignment of the length of the fourth stock segment is similar to the alignment of the length of the third foam segment.

The third foam segment is then joined to the fourth stock segment.

This procedure of alternative successive layers of stock segments and foam segments could continue ad infinitum as long as there was sufficient space upon the support surface. Since the support surface is preferably a moving conveyor belt, these aforementioned procedures of stacking successive layers of stock segments and foam segments could continue without stopping.

It is important to note that the width, length, and common thickness of the first stock segment, first foam segment, second stock segment, second foam segment, third stock segment, third foam segment, forth stock segment, and so on could be any desired amount. Consequently, the broader appended claims must be interpreted without limitation to any particularly specific dimensions.

Notwithstanding the foregoing statements, the inventor prefers to use the following dimensions. The inventor prefers that the first stock segment, first foam segment, second stock segment, second foam segment, third stock segment, third foam segment, and forth stock segment have a length of about four feet. Consequently, the resulting composite billet will have a width of about four feet.

The inventor also prefers that the aforementioned common thickness be about three inches when the composite billet will be used to manufacture common blank door styles.

The inventor prefers that the aforementioned common thickness be about two and thirteen sixteenths of an inch when the composite billet will be used to manufacture exterior door jambs.

The inventor prefers that the aforementioned common thickness be about one and thirteen sixteenths of an inch when the composite billet will be used to manufacture interior door jambs.

It should be remembered at this point that the thickness of the stock segments and foam segments will generally effect the ultimate width of the composite products.

Of course, any other dimension could be used depending upon the ultimately desired thickness and/or width of the composite product.

It should also be acknowledged that the widths of the stock segments and foam segments will determine where those elements will be located within the ultimately enclosed composite product. For example, a common door style must have added strength adjacent to where the kickplate, hinges, locks, handles and other hardware and/or panels will be secured. Consequently, the following description lists the preferred widths of the identified elements at this stage in the manufacturing process: the first stock segment has a width of about eight inches; the first foam segment has a width of about twenty-two and one half inches; the second stock segment has a width of about eleven inches; the second foam segment has a width of about nineteen and one half inches; the third stock segment has a width of about four inches; the third foam segment has a width of about nine inches; and the fourth stock segment has a width of about four or more inches.

If a continuous or semicontinuous process of manufacturing is used, the first first stock segment would have a width of about eight inches, however the fourth stock segment could have a width of about twelve inches, rather than the four inches stated in the previous paragraph. This permits the composite billet to be crosscut at a later stage in the process along the length of the fourth stock segment to produce both a top or fourth stock segment for the first composite billet and the next first stock segment of the subsequently produced composite billet. In fact, this is the preferred method to manufacture a large volume of composite products to be used as standard door stiles and will be discussed further below.

If the composite product is to be placed in different service than that of a standard door stile, the aforementioned dimensions would probably change.

For example, if the composite product is to be used as an interior door jamb, the following description lists the preferred widths of the identified elements: the first stock segment has a width of about two and one half inches; the first foam segment has a width of about five inches; the second stock segment has a width of about six inches; the second foam segment has a width of about twenty two and one quarter inches; the third stock segment has a width of about eleven and one half inches; the third foam segment has a width of about twenty two and one quarter inches; the fourth stock segment has a width of about six inches; the fourth foam segment has a width of about five inches; and the fifth stock segment has a width of about two and one half or more inches.

When thus juxtaposed and joined the resulting composite billet has a first surface, an opposed second surface, a first side, a second side, a leading edge, and what loosely can be termed as a trailing edge.

It should be remembered that the stock segments and the foam segments should have a common generally uniform thickness. This will greatly simplify the following procedures.

If needed, an additional step of surface sanding the first surface of the composite billet could be implemented. Such sanding processes should occur prior to juxtaposing and joining the sheathing or first cover sheet to the first surface of the composite billet as will be described further below.

Similarly, the second surface of the composite billet could also be surface sanded. Such sanding processes should occur prior to juxtaposing and joining the sheathing or second cover sheet to the second surface of the composite billet.

If the first and/or second surfaces of the composite billet are surface sanded, caution should be exercised to remove all dust and debris away from the smooth surfaces of the composite billet. This may be done by using a vacuum system. It should be noted that most, if not all, commercial surface sanding equipment will have a dust removal system built into the machinery.

The next step in manufacturing the composite product is to apply and join sheathing material to the opposed surfaces or sides of the composite billet. For example, such step comprises juxtaposing and joining a first cover sheet of sheathing material to the first surface of the composite billet. Similarly, a second cover sheet of sheathing material is juxtaposed and joined to the second surface of the composite billet.

At this juncture in the process, the manufacturer must determine how many sheets of sheathing material are going to be placed upon each opposed planar face of the composite billet. For example, if a door jamb product will be made, only a single sheet of P-CEL, plywood, or other material needs to be applied to the composite billet. However, if a door style is to be made, the manufacturer may decide to use two or more layers of sheathing on each opposed side of the composite billet to increase the strength therein.

Once the manufacturer has determined the number of sheets of sheathing material to be placed upon each opposed side of the composite billet, the manufacture then must determine whether the ultimately exposed surfaces of the composite product will be painted, stained, or further veneered and/or laminated. If such exposed, exterior surfaces are to be painted, then the substrate or interior layer of sheathing material might comprise a plywood and the outermost layer of sheathing material may comprise P-CEL or some other material. The reason for doing this is that P-CEL is already very smooth and consequently is easily painted.

Alternatively, if a rough exterior surface is desired for staining, appearance, or for further veneering and/or laminating, then the substrate or interior layer of sheathing material might comprise a sheet of P-CEL and the outermost layer of sheathing material may comprise plywood or some other material.

A further alternative is to use multiple layers of the same sheathing material, such as two or more layers of P-CEL and/or plywood placed upon each other.

As one can see, the manufacturer is given significant latitude and freedom to select the type, size, and order of the materials used within the composite product.

If P-CEL is used, segments of P-CEL may be unrolled from large rolls of the material and be properly placed upon the planar surfaces of the composite billet.

Alternatively, planar strips and/or sheets of wood, engineered wood, P-CEL, plywood, plastic, metal, fiberglass, etc., can be used.

It should be noted that throughout this Specification and appended claims, reference is made to juxtaposing, orienting, aligning, applying, and/or placing particular elements in particular ways. Such terms are used synonymously herein and are not intended to place particular restrictions beyond the general definitions of such combined terms.

If an adhesive is used to join the sheathing material to the composite billet, the inventor prefers that, after the first cover sheet is juxtaposed upon the first side of the composite billet and the second cover sheet is juxtaposed upon the second side of the composite billet, the combined covering sheets of sheathing material and interior composite billet be passed through a throat of a pinch press. The pinch press presses against the outer surfaces of the sheathing material to assure tight engagement between the cover sheets and the composite billet and that proper bonding occurs.

Within the preferred embodiment of the invention, two layers of sheathing material are used on each face or side of the composite billet. More particularly, after the first and second cover sheets are applied and joined to the composite billet, a third cover sheet is juxtaposed against and joined to the exterior surface or face of the first cover sheet of the composite billet. Similarly, a fourth cover sheet is juxtaposed against and joined to the exterior surface or face of the second cover sheet of the composite billet. The multilayered composite billet may be passed through one or more pinch presses.

If the thickness of the composite billet becomes excessive for proper operation of a pinch press, other forms of assuring a tight engagement and proper bonding may be used. For example, a bladder press or other pressing means may be used.

At this stage of the process the two largest planar surfaces of the composite billet are now covered with one or more layers of sheathing material. However the stock segments and the foam segments can still be seen along the lateral sides of the composite billet.

The composite billet is now cut longitudinally along its length, in effect slicing off at least one segment of its side edge therefrom. In other words, the composite billet is cut in a generally transverse manner to the joint lines between the stock segments and foam segments to form at least one core stock element. The core stock element has a first surface, an opposed second surface, a first side, a second side, a leading edge, and a trailing edge;

A plurality of core stock elements can be created by making several spaced cuts along the length of the composite billet.

Alternatively and preferably, the composite billet can be gang cut to form the plurality of core stock elements. This process enables the continuous or near continuous manufacture of core stock elements without creating a delay for oncoming composite billets. Each of the core stock elements has a predetermined width, length, and thickness.

For the next step in the procedure, the plurality of core stock elements are juxtaposed or placed in aligned but spaced, generally parallel orientation one to another. Each of the core stock elements, however is pivoted, rotated, or reoriented so that the exposed stock segments and the exposed foam segments on one side of each core stock element falls within a shared, common plane.

If needed, each individual core stock element and/or the plurality of core stock elements can be surface sanded. More particularly, the first surface of the core stock element can be surface sanded prior to juxtaposing and joining the first core cover sheet to the first surface of the core stock element as will be described further below. Similarly, the second surface of the core stock element can be surface sanded prior to juxtaposing and joining the second core cover sheet to the second surface of the core stock element.

Additional sheathing material is now applied and joined to the core stock element or plurality of core stock elements to encapsulate the foam segments therein and thereby form the composite product. More particularly, a first core cover sheet of sheathing material is juxtaposed against and joined to the first surface of the core stock element. Similarly, a second core cover sheet of sheathing material is juxtaposed against and joined to the second surface of the core stock element, thereby creating the composite product.

Within the preferred embodiment of the invention, the core stock element is passed through a throat of a pinch press after the first core cover sheet is juxtaposed upon the first surface of the core stock element and the second core cover sheet is juxtaposed upon the second surface of the core stock element.

If a plurality of core stock elements were formed and placed in narrowly spaced relationship to one another, the first core cover sheet can be juxtaposed against and joined to each of the first surfaces of the plurality of core stock elements. Similarly, the second core cover sheet can be juxtaposed against and joined to each of the second surfaces of the plurality of core stock elements.

Within the preferred embodiment of the invention the spacing between adjacent core stock elements is about one eighth of an inch. This enables the next step in the procedure to be performed with the minimum amount of waste and obtain a maximum benefit from the materials used.

The next step in the procedure is to cut the first core cover sheet and the second core cover sheet along the spaces located between adjacent core stock elements to separate and form a plurality of the composite products.

If desired, the composite products can be further surface sanded. The inventor believes, however, that such an additional step of surface sanding the composite products is not necessary if the preceding steps were properly performed.

If needed and/or desired, an exterior veneer or solid wood members can be laminated or veneered to the outer surfaces of the composite product.

The reader should note that the Specifications and disclosures contained within this inventor's previously filed patent application Ser. No. 08/335,438, and within U.S. Pat. No. 5,361,552, and U.S. Pat. No. 5,218,807 are incorporated within the Specification and disclosure of this application by this reference.

The manufactured composite product may be used within the doors, door stiles, door rails, paneling, trim, and door jambs as described and claimed within this inventor's previously filed patent applications and issued patents. Furthermore, such composite products could feasibly replace nearly all decorative and/or structural lumber products, including but not limited to framing, siding, paneling, etc., used within the construction of residential homes and commercial buildings, window frames, window jambs, cabinetry, furniture, decks, fences, and the like.

The foregoing explanation is a summary and overview of various aspects of the invention and is not intended as a comprehensive explanation of the claimed subject matter. Consequently, to have a more complete understanding of the claimed invention, one should review the following explanation, drawings, and appended claims. The following explanation and the appended claims are incorporated herein by reference.

The aforementioned and other objectives and advantages of the present invention will become more readily apparent upon reading the following disclosure and referring to the attached drawings.

BRIEF DESCRIPTION OF DRAWINGS

FIG. 10 is an isometric, schematic view of the encapsulated core stock elements, further illustrating cut lines that separate the composite billet into a plurality of composite products.

FIG. 11 is an isometric, schematic view of a resulting composite product.

FIG. 18 is an isometric, schematic view of the encapsulated multiple layered composite billet of FIG. 15, further illustrating cut lines that separate the multiple layered composite billet into a plurality of composite products.

FIG. 19 is an isometric, schematic view of a resulting composite product that can be used as a door jamb.

One should understand that the drawings are not necessarily to scale and the elements are sometimes illustrated by graphic symbols, phantom lines, diagrammatic representations, and fragmentary views. In certain instances, the inventor may have omitted details that are not necessary for an understanding of the present invention or that render other details difficult to perceive.

BEST MODE FOR CARRYING OUT THE INVENTION

Figure 1:
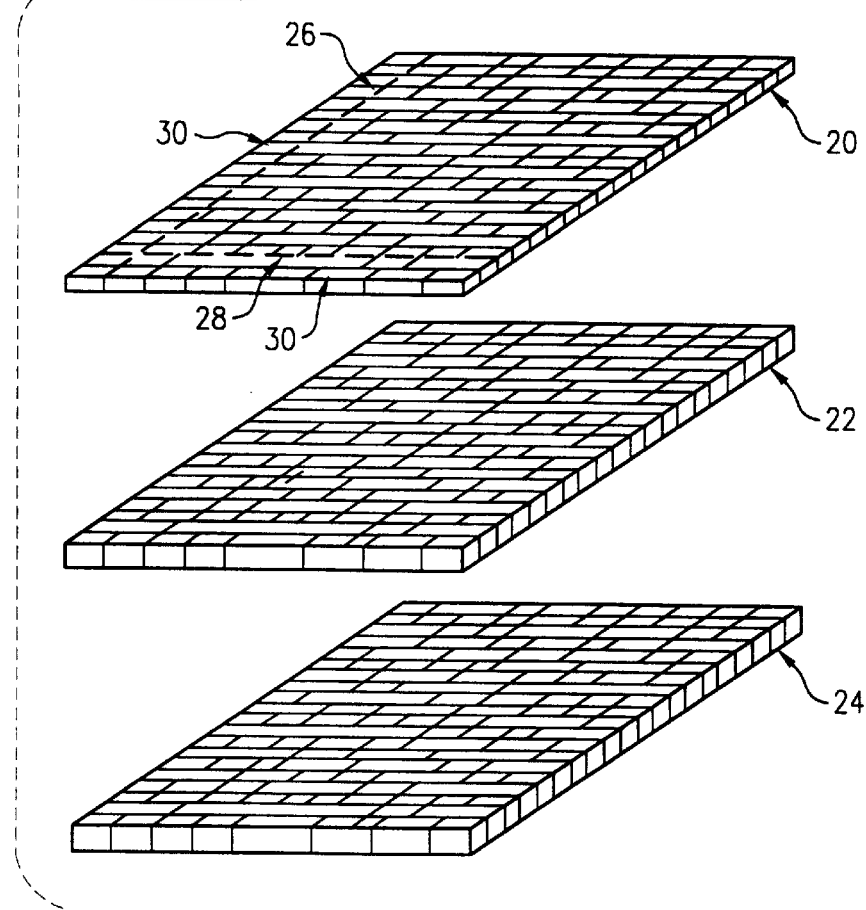
FIG. 1 is an isometric, schematic view of three alternative butcher blocks or stock blocks that can be used within the present invention.

Referring to the drawings, wherein like numerals indicate like parts, FIG. 1 illustrates three alternative butcher blocks or stock blocks 20, 22, and 24.

The uppermost stock block 20 has a thickness of about one and thirteen sixteenths of an inch for use in the manufacture of interior door jambs using the composite products of the present invention.

The middle stock block 22 has a thickness of about two and thirteen sixteenths of an inch for use in the manufacture of exterior door jambs using the composite products of the present invention.

The lowermost stock block 24 has a thickness of about three inches for use in the manufacture of interior door styles and/or rails using the composite products of the present invention.

The dashed lines 26 and 28 shown in the uppermost stock block 20 illustrate how the stock blocks 20, 22, and/or 24 can be cut to form a plurality of stock segments 30. The inventor has found no particular benefit to cutting stock blocks 20, 22, or 24 with or against the grain of the joined wood segments.

Of course, other stock blocks having different thicknesses as described above could also be used within the present invention.

Figure 2:
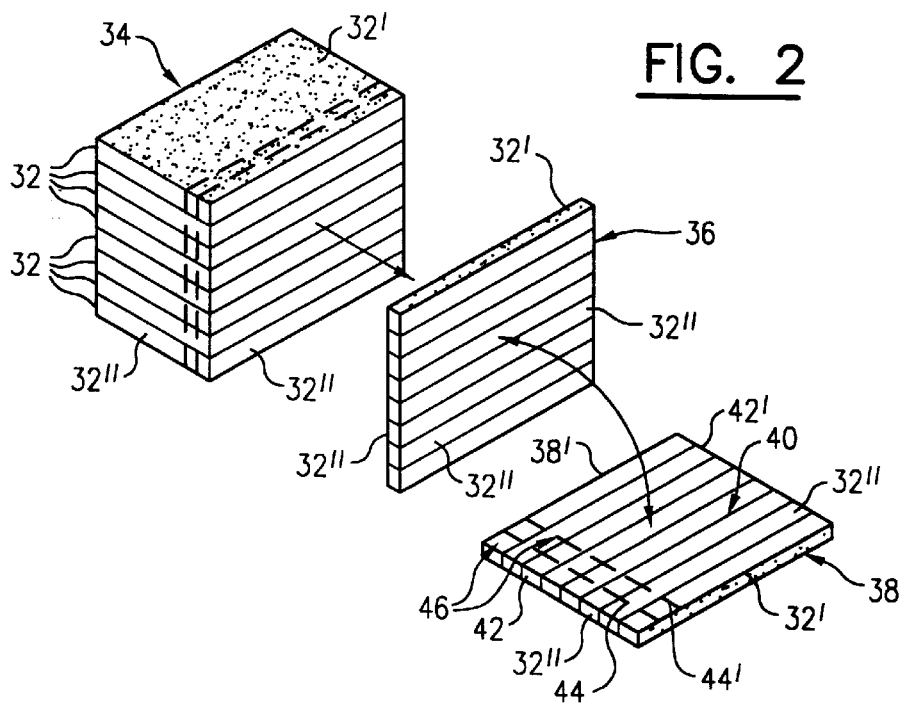
FIG. 2 is an isometric, schematic view of a plurality of sheets of foam that are stacked or layered and joined to one another to form a foam billet. The foam billet is cut to form reengineered foam sheets wherein the more dense surfaces thereof are positioned along its edges or sides. The stacked or layered foam sheets are then cut to form a plurality of foam segments.

FIG. 2 illustrates a plurality of sheets of foam 32 that are stacked or layered and joined to one another to form a foam billet 34.

Each foam sheet 32 has a planar surface 32' and edge or side surfaces 32". Foam sheets 32 are usually manufactured with a more dense planar surface 32' than the edge or side surfaces 32". For example, planar surface 32' may have a sixty (60) pound per square inch rating, whereas the edge or side surfaces 32" may have a twenty (20) pound per square inch rating.

During this optional but preferred step, foam billet 34 is cut to form new reengineered foam sheets 36 wherein the more dense surfaces 32' thereof are now positioned along two opposed ends 38 and 38'. The lesser dense surfaces 32" are now positioned along the generally flat planar surfaces 40 and sides 42 and 42'.

The newly formed stacked or layered foam sheets 36 are then cut, such as along cut lines 44 and 44', etc., to form a plurality of foam segments 46.

As described above, alternating layers of cut stock segments 30 and foam segments 46 are juxtaposed against a support surface 48 and are urged against one another in a generally aligned manner.

The support surface 48 may comprise any adequate surface, but preferably is a continuous or nearly continuous conveyor belt that also functions as a moving table top.

It is also important that the stock segments 30 and foam segments 46 have a generally common thickness.

Figure 3:
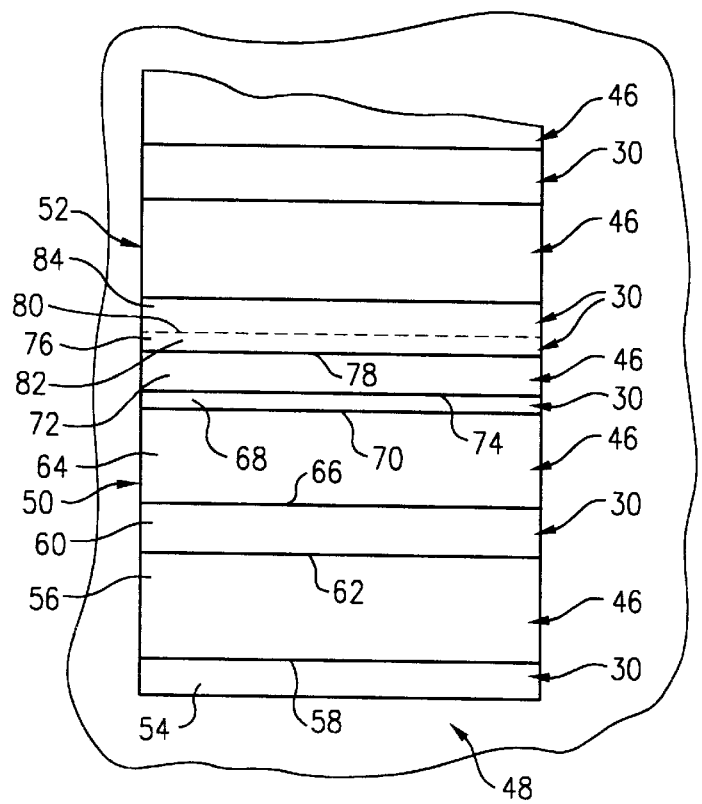
FIG. 3 is a plan view of a first and subsequent composite billet, illustrating the juxtaposition and joining of alternating layers of stock segments and foam segments.

FIG. 3 illustrates the juxtaposition and joining of alternating layers of stock segments 30 and foam segments 46 to form a first composite billet 50 and a following or subsequent second composite billet 52.

The preferred layout or embodiment shown in FIG. 3 is for use with standard sized door stiles, wherein a first stock segment 54 has a width of about eight (8) inches, a length of about four (4) feet, and a thickness of about three (3) inches. Please note that the thickness of the first stock segment 54 extends outwardly away from the support surface 48.

The first stock segment 54 will later function as a lowermost solid element on the door style to which the kickplate or lowermost door rail may be attached and/or for placement of a hinge thereon, if needed.

A first foam segment 56 has a width of about twenty two and one half (22½) inches, a length of about four (4) feet, and a thickness of about three (3) inches. The first foam segment 56 is placed against the support surface 48 and is urged against the trailing end or edge 58 of the first stock segment 54. The first foam segment 56 is also aligned to that its elongated length is generally similar to the length of the first stock segment 54. In other words, they are oriented to abut against and adjoin one another. Furthermore, first foam segment 56 is joined and/or adhesively attached to first stock segment 54 along edge 58.

A second stock segment 60 having a width of about eleven (11) inches, a length of about four (4) feet, and a thickness of about three (3) inches is placed against the support surface 48 and is urged against and joined to the trailing end or edge 62 of the first foam segment 56. The second stock segment 60 is also aligned with the length of the first foam segment 56.

The second stock segment 60 will later function as a generally waist high solid element on the door style to which another door rail may be attached. The second stock segment 60 also provides a solid location for placement of a lock, handle, and associated hardware, and/or for placement of a hinge, depending upon which side of the door the stile is ultimately used.

A second foam segment 64 having a width of about nineteen and one half (19½) inches, a length of about four (4) feet), and a thickness of about three (3) inches is placed against the support surface 48 and is urged against and joined to the trailing end or edge 66 of the second stock segment 60. The second foam segment 64 is also aligned with the length of the second stock segment 60.

A third stock segment 68 having a width of about four (4) inches, a length of about four (4) feet, and a thickness of about three (3) inches is placed against the support surface 48 and is urged against and joined to the trailing end or edge 70 of the second foam segment 64. The third stock segment 68 is also aligned with the length of the second foam segment 64.

The third stock segment 68 will later function as another solid element on the door style to which another door rail may be attached. More particularly, another door rail is needed when a six (6) panel door is manufactured. In essence, the lower edges of the two (2) uppermost panels and the upper edges of the two (2) panels immediately therebelow are secured to such a door rail. Consequently, the door style must be strengthened at the location where such door rail is attached thereto. Third stock segment 68 serves this function. The third stock segment 68 may also provide a solid location for placement of a hinge, if needed.

A third foam segment 72 having a width of about nine (9) inches, a length of about four (4) feet, and a thickness of about three (3) inches is placed against the support surface 48 and is urged against and joined to the trailing end or edge 74 of the third stock segment 68. The third foam segment 72 is also aligned with the length of the third stock segment 68.

A fourth stock segment 76 having a width of about twelve (12) inches, a length of about four (4) feet, and a thickness of about three (3) inches is placed against the support surface 48 and is urged against and joined to the trailing end or edge 78 of the third foam segment 72. The fourth stock segment 76 is also aligned with the length of the third foam segment 72.

Please note that the width of the fourth stock segment 76 was given as about twelve (12) inches. The reason for this is that the fourth stock segment 76 will be rip cut along its length along cut line 80 to separate the first composite billet 50 from the second composite billet 52. In other words, first composite billet 50 may be separated from second composite billet 52 using an in-line or traveling rip saw to rip along cut line 80. In essence, first composite billet 50 is cut or trimmed to the desired length.

Thereafter, the twelve (12) inch wide fourth stock segment 76 will actually form a four (4) inch wide top stock segment 82 for the first composite billet 50 and an eight (8) inch wide first stock segment 84 for the second composite billet 52.

The fourth stock segment 76 and/or top stock segment 82 will later function as a solid element on the door style to which the uppermost door rail may be attached. The fourth stock segment 76 and/or top stock segment 82 may also provide a solid location for placement of a hinge, if needed.

Please note that the inventor prefers that first stock segment 54 and top stock segment 82 are made from a material that can be easily cut if needed. This not only assists in the separation of the first composite billet 50 from the second composite billet 52, but also permits an end user of the door style thus created to trim the door style if needed by shaving or cutting off a portion of the width of first stock segment 54 and/or top stock segment 82.

Since the second composite billet 52 is basically identical to the first composite billet 50, further explanation of the second composite billet 52 will not be made.

This procedure of using alternative successive layers of stock segments 30 and foam segments 46 could continue ad infinitum as long as there was sufficient space upon the support surface 48 to hold such materials. Within the preferred embodiment of the invention, the support surface 48 comprises a conveyor belt that feeds the stock segments and foam segments 46 further down the process.

Once the adhesive bond or other form of adjoining the aforementioned stock segments 30 and foam segments 46 has set, the composite billet 50 may be further processed. Set time for currently available commercial adhesives range from a few seconds or minutes, to several hours. Since it is the intention of the inventor to produce a procedure that mass produces composite products, the shorter set time the better. However, set time must be weighed against the cost of the purchased adhesive and availability of storage space without causing damage to the composite billets during the set period.

Since the procedures described herein will most likely be continuously practiced, subsequently placed stock segments 30 and foam segments 46 that are used within second composite billet 52 and later composite billets will continually be urged against the stock segments 30 and foam segments 46 contained within the first composite billet 50. Consequently, the movement and juxtaposition of subsequent stock segments and foam segments will assure a tight engagement and better adhesive bond between the earlier placed stock segments and foam segments.

If needed, the composite billet 50 may be set aside until the adhesive has cured.

Alternatively, the manufacturing process may continue and the curing time occurs after the composite products 50 and 52, etc., are actually finished.

The next step in the procedure is optional, but is preferred by the inventor, namely to pass the bonded composite billet 50 between rotating sanding drums 86 to lightly surface sand the upper and lower planar surfaces 88 and 90 of the composite billets 50, 52, etc.

Figure 5:
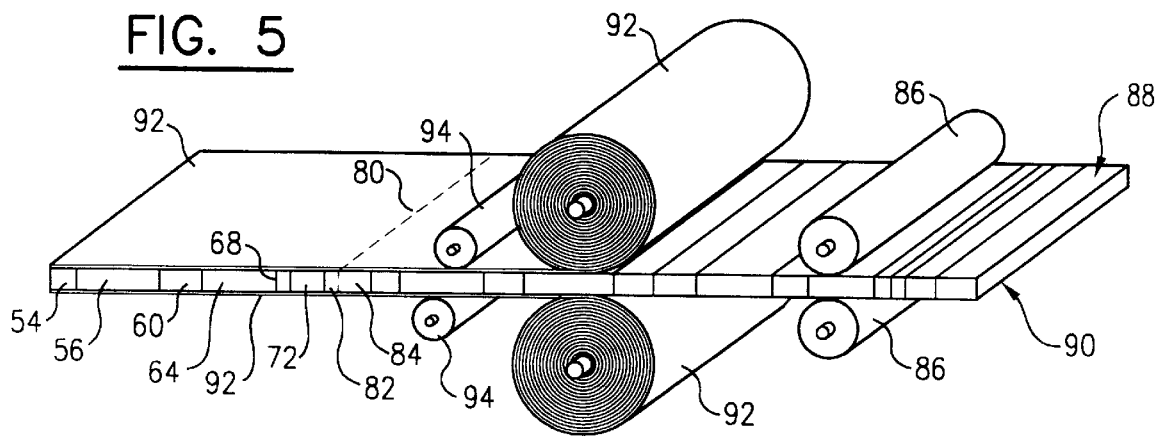
FIG. 5 is an isometric, schematic view as shown in FIG. 4, but not with an exploded perspective.
Figure 4:
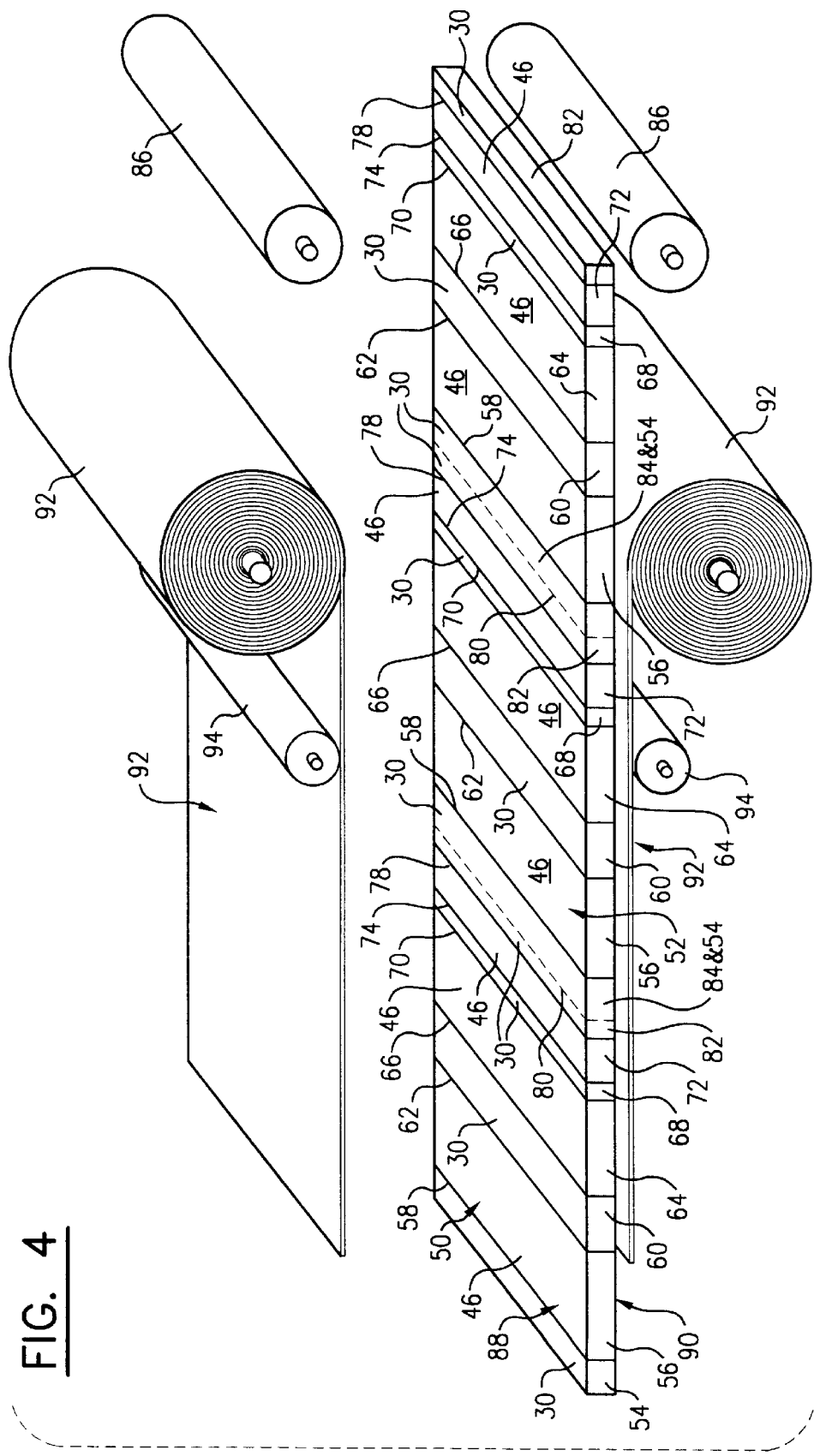
FIG. 4 is an isometric, schematic, exploded view of the composite billet being passed between surface sanders, sheathing being juxtaposed against and joined to the composite billet, and the combined sheathing and composite billet passing through the throat of a pinch press.

FIGS. 4 and 5 illustrate the composite billets 50, 52, etc., being passed the sanding drums 86 of a surface sander. As mentioned above, it is also important at this stage or step to remove the dust and other debris from off of surfaces 88 and 90.

FIGS. 4 and 5 also illustrate sheathing 92 in the form of rolled sheets of P-CEL material being juxtaposed against and joined to the planar surfaces 88 and 90 of composite billets 50 and 52, etc. Sheathing 92 can also represent the juxtaposition against and joining of planar sheets of plywood or other forms of sheathing material to the planar surfaces 88 and 90 of the composite billets 50, 52, etc.

Please note that after the sheathing 92 is placed upon and joined or adhered to the composite billets 50, 52, etc., the combined sheathing 92 and composite billets 50, 52, etc., are passed through the throat of a pinch press 94. As illustrated in FIGS. 4 and 5, the throat of the pinch press 94 generally comprises the space between two or more rotating rollers that are urged against the exterior surfaces of the sheathing 92.

Figure 6:
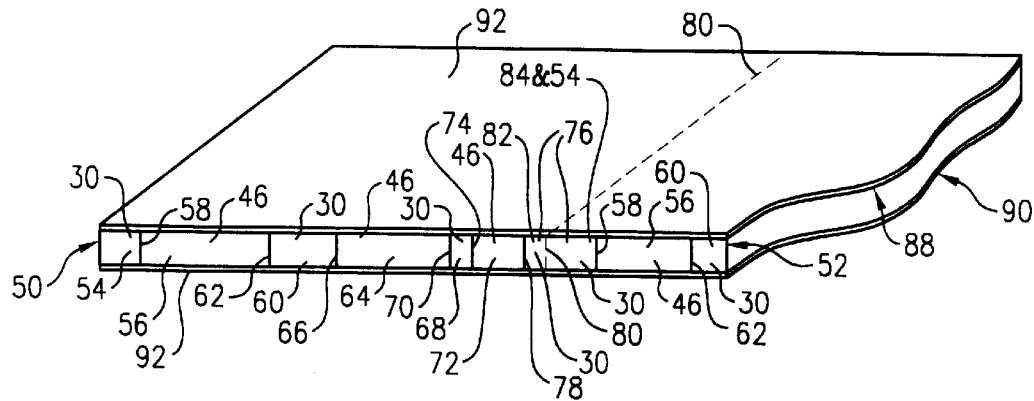
FIG. 6 is an isometric, schematic view of the combined composite billet and sheathing covering, further illustrating a cut line to separate a first composite billet from a following second composite billet.

FIGS. 4, 5, and 6 illustrate how cut line 80 that can be used to separate the first composite billet 50 from the following second composite billet 52.

Figure 7:
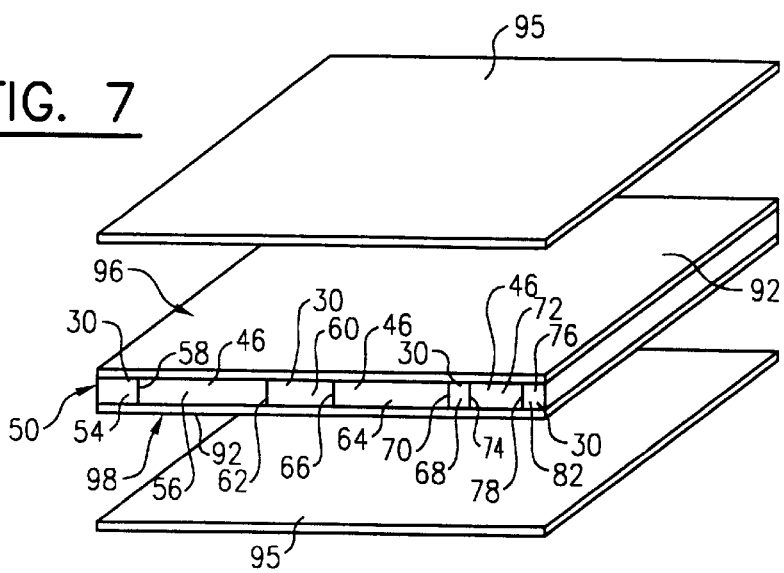
FIG. 7 is an isometric, schematic, exploded view of the combined composite billet and sheathing covering receiving a second layer of sheathing material.
Figure 8:
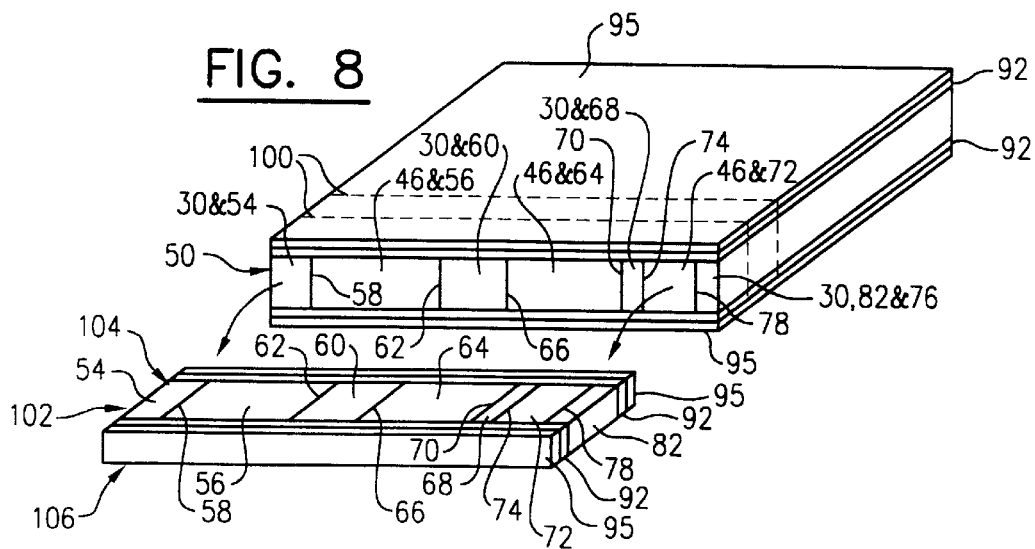
FIG. 8 is an isometric, schematic view of the combined composite billet and sheathing covering being cut to form at least one core stock element.

Even though FIG. 7 is shown as having an exploded perspective, FIGS. 7 and 8 illustrate the juxtaposition against and joining of a second pair or layer of sheathing 95 material to the exterior planar surfaces 96 and 98 of the combined composite billet 50 and first pair or layer of sheathing 92. The use of a second pair or layer of sheathing 95 is optional and depends upon the particular application for which the composite product will be used.

It should be noted that for this process to manufacture standard door stiles, the overall length of the composite billet 50 is about six (6) foot eight (8) inches.

FIG. 8 further illustrates that the combined composite billet 50 and first and second pairs or layers of sheathing 92 and 95 are cut along successively space cut lines 100 to form one or more core stock elements 102.

Figure 9:
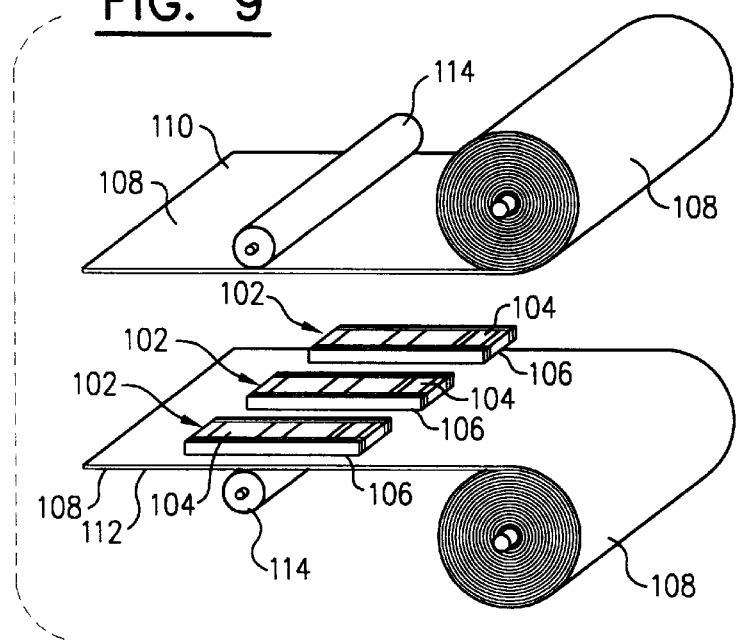
FIG. 9 is an isometric, schematic, exploded view of a plurality of core stock elements placed in spaced orientation one to another, having additional sheathing in the form of a first core cover sheet and a second core cover sheet juxtaposed against and joined to the core stock elements, and then being passed through the throat of a pinch press.
Figure 12:
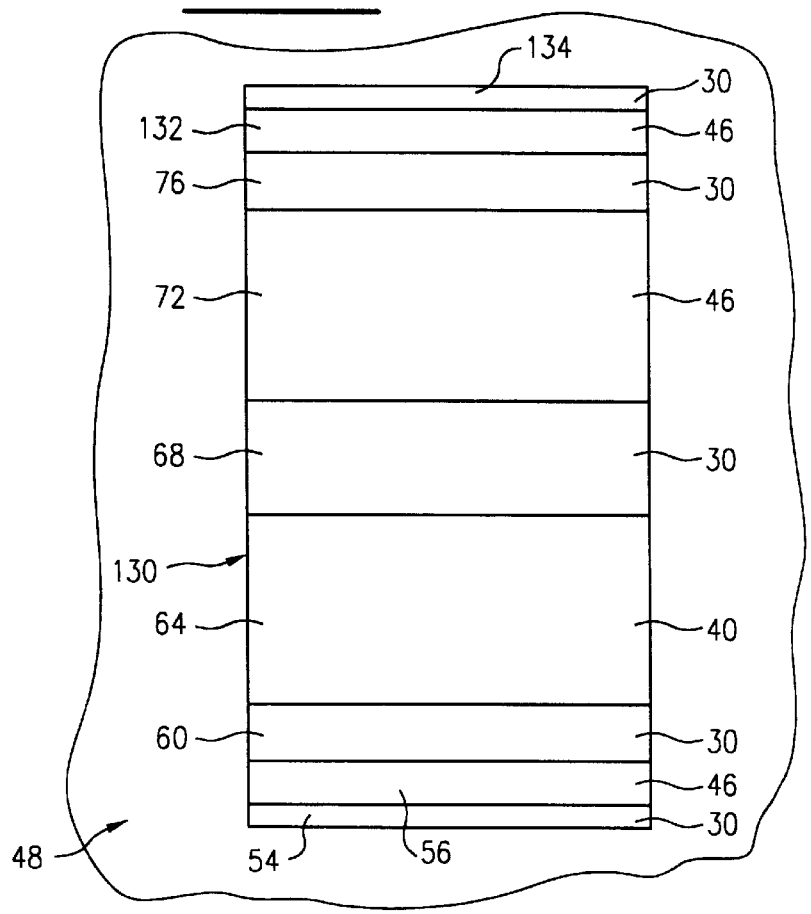
FIG. 12 is a plan view of an alternative first and subsequent composite billet, illustrating the juxtaposition and joining of alternating layers of stock segments and foam segments that will be used to form a plurality of composite products used as door jambs.

FIG. 9 illustrates, in an exploded view format, that the uncovered sides (cut-surfaces or cut-faces) 104 and 106 of one or more of the core stock elements 102 can be further covered with sheathing 108. Please note the uncovered sides 104 and 106 are those sides of the core stock elements 102 wherein the foam segments 46 are still exposed.

Within the preferred embodiment of the invention, a plurality of core stock elements 102 are place in spaced orientation one to another so that uncovered sides 104 and 106 are within their common respective planes. Additional sheathing 108 is then juxtaposed against and joined to each opposed uncovered side 104 and 106 of each core stock element 102. Thus, the foam segments 46 contained within the interior of the core stock elements 102 are completely encapsulated within sheathing 102 and 92, and/or sheathing 95.

In essence, the sheathing 108 that is juxtaposed against and joined to the uncovered side 104 can be referred to as a first core cover sheet 110. Similarly, the sheathing 108 that is juxtaposed against and joined to the uncovered side 106 can be referred to as a second core cover sheet 112.

Even though FIG. 9 uses an exploded format, FIG. 9 does illustrate that after the sheathing 108 and, more particularly, first core cover sheet 110 is placed upon and joined or adhered to the uncovered side 104 of the core stock elements 102, and second core cover sheet 112 is placed upon and joined or adhered to the uncovered side 106 of the core stock elements 102, the combined sheathing 108 and core stock elements 102 are passed through the throat of a pinch press 114. The throat of the pinch press 114 generally comprises the space between two or more rotating rollers that are urged against the exterior surfaces of the sheathing 108.

As illustrated in FIG. 10, this process in effect completely encapsulates the foam segments 46 within the core stock elements and sheathing 108 to create a composite billet 115.

Please note that to reduce the amount of unnecessary waste, each of the adjacently placed and aligned core stock elements 102 are slightly spaced apart from one another. More particularly, the inventor prefers to space such elements approximately one eight (⅛) of an inch apart.

As a result, after the sheathing 108 is applied and joined to the plurality of core stock elements 102, to form the composite billet 115, the composite billet 115 is passed through a single saw blade 116, a gang of saw blades 116, and/or past stationary knives 118 to cut the sheathing 108 along cut lines 120. This enables the composite billet 115 to be cut into a plurality of composite products 122.

FIG. 11 illustrates one example composite product 122 that can be manufactured using the described and claims processes.

If desired and/or needed, an exterior veneer or other treatment, such as painting, staining, etc., can be applied to the exterior surfaces of the composite product 122. Furthermore, hinges, screws, nails, holes, and other apparatus and/or features can be placed and/or secured to the composite product 122.

As previously mentioned, the foregoing detailed description primarily relates to the manufacture of composite products 122 to be used as component parts in the manufacture of a door, and, more particularly, of door stiles.

The procedure to manufacture door rails would be very similar to the description stated above, except the number and size of the stock segments 30 and foam segments 46 will be different.

However, there are some procedural differences between the manufacture of door parts and the manufacture of door and window jambs. Since many of the procedures are the same, only the most notable differences will be described below.

The reader's attention is drawn to FIGS. 12 through 19, inclusively, which illustrate the manufacture of door jamb and window jamb parts.

A door jamb covers each side and often the header of a door opening. In effect, the door itself is attached to one side of the door jamb. A thinner dimensioned strip of molding is formed or nailed down usually the vertical centerline of one side of the door jamb. As you close the door, the outermost edge of the door is urged against that strip as the door latch is engaged. Otherwise, the door would simply swing right through the door opening like a pair of cafe doors.

Due to the need for the aforementioned thin strip of molding, the composite product 122 of the present invention should be provided with an interior stock segment 30 running the longitudinal length of the door jamb so that there is something to which the strip of molding can be nailed and held in position. The placement of this interior stock segment 30 or nailer strip is one of the primary focuses of the next embodiment of the present invention.

Please note that in order to keep the number of reference numerals to a reasonable level, common, previously discussed reference numerals will be used for each element and/or feature that is shared between the previously explained embodiment and the following embodiment.

For example, the same stock blocks 20, 22, and 24, stock segments 30, sheets of foam 32, foam billets 34, reengineered foam sheets 36, foam segments 46, and support surface 48 can be used to create a composite billet 130 for this embodiment. However, the layout and dimension of the stock segments 30 and foam segments 46 will be different within the composite billet 130.

More particularly, the composite billet 130 will comprise the juxtaposition and successive joining of the following elements in the following order:
(a) a first stock segment 54 having a width of about two and one half (2½) inches;
(b) a first foam segment 56 having a width of about five (5) inches;
(c) a second stock segment 60 having a width of about six (6) inches;
(d) a second foam segment 64 having a width of about twenty two and one quarter (22¼) inches;
(e) a third stock segment 68 having a width of about eleven and one half (11½) inches;
(f) a third foam segment 72 having a width of about twenty two and one quarter (22¼) inches;
(g) a fourth stock segment 76 having a width of about six (6) inches;
(h) a fourth foam segment 132 having a width of about five (5) inches; and
(i) a fifth stock segment 134 having a width of about two and one half (2½) inches.

The length of the first stock segment 54, first foam segment 56, second stock segment 60, second foam segment 64, third stock segment 68, third foam segment 72, fourth stock segment 76, fourth foam segment 132, and fifth stock segment 134 will be about four (4) feet.

The thickness of the first stock segment 54, first foam segment 56 second stock segment 60, second foam segment 64, third stock segment 68, third foam segment 72, fourth stock segment 76, fourth foam segment 132, fifth stock segment 134 will be about one and thirteen sixteenths (1¹³⁄₁₆) inches for use within interior door jambs, and will be about two and thirteen sixteenths (2¹³⁄₁₆) inches for use within exterior door jambs.

Please note that the width of the fifth stock segment 134 is the final desired width. If successive lengths of composite billets 130 are to be manufactured, the width of the fifth stock segment 134 can be increased to accommodate for both the last or top stock segment of the first composite billet 130 and the lowermost or first stock segment of the next composite billet.

Figure 13:
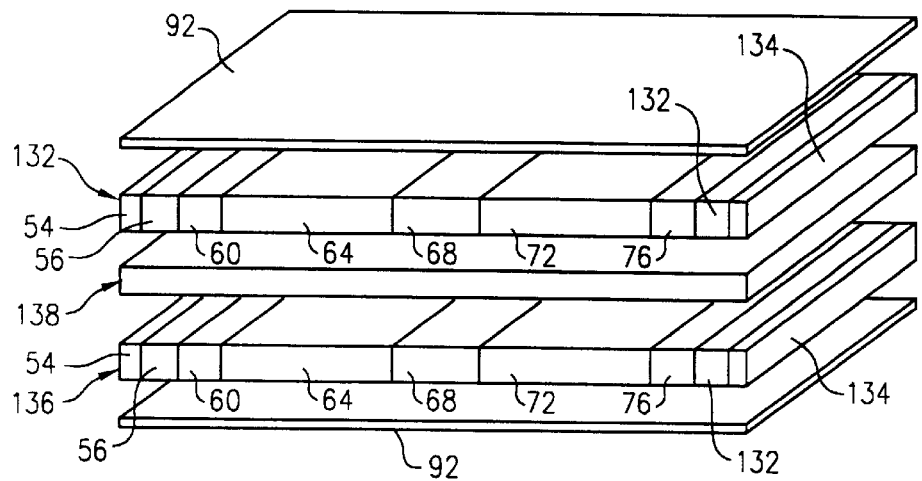
FIG. 13 is an isometric, schematic, exploded view of a multiple layered composite billet having a first composite billet, a centrally located full width and length stock segment, a matching and similarly oriented second composite billet, and outer layers of sheathing that are juxtaposed against and joined to the interior multiple layered composite billet.
Figure 14:
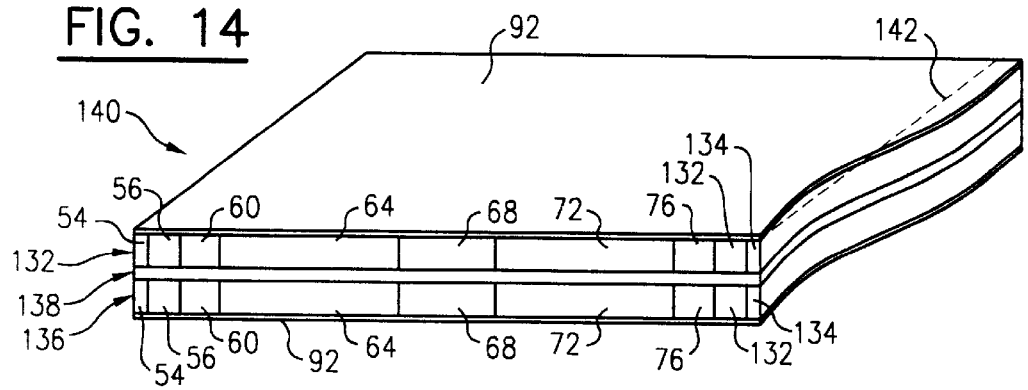
FIG. 14 is an isometric, schematic view as shown in FIG. 13, but not with an exploded perspective, further illustrating a cut line to separate a first multiple layered composite billet from a following second multiple layered composite billet.

Reference is now made to FIGS. 13 and 14, which illustrates in an exploded format the various component parts of this alternative embodiment of the invention. Please note that there is actually a first composite billet 132 and a second composite billet 136. Composite billets 132 and 136 are basically identical to one another. However, a sheet of nailing material 138 is juxtaposed or sandwiched between the first composite billet 132 and the second composite billet 136.

The nailing material 138 may comprise any material similar to the types of materials previously described with respect to the stock segments 30.

The nailing material has a width of about four (4) feet, has a length equal to the length of either the first or second composite billets 132 or 136, and has a thickness of about one half (½) to two (2) inches.

The resulting stack of materials can be referred to as a multiple layered composite billet, with a centrally located nailing material 138 that extends the full width and length of the composite billet.

As seen in FIGS. 13 and 14, outer layers of sheathing material 92 are juxtaposed against and joined to the exterior planar surfaces of the multiple layered composite billet, and, more particularly, to the first and second composite billets 132 and 136, respectively.

A pinch press, a bladder press, or any other form of a press may be used if desired to urge the sheathing material 92 into tight engagement with and adhere to the adjacent immediately adjacent composite billet 132 or 136.

If needed, the multiple layered composite billet 140 may be cut along cut line 142 to separate it from following, subsequently created multiple layered composite billets.

Figure 15:
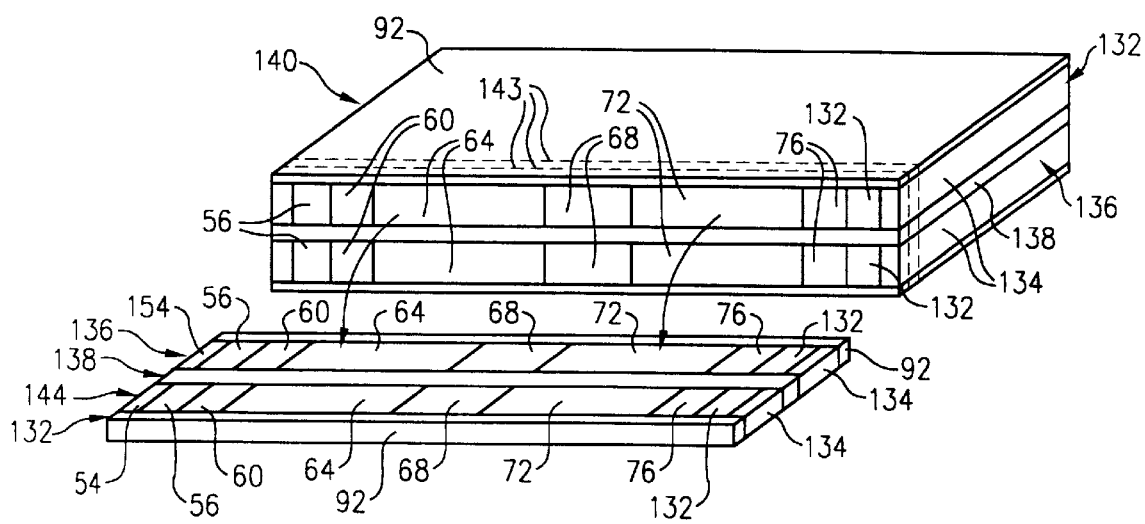
FIG. 15 is an isometric, schematic view of the combined multiple layered composite billet and sheathing covering being cut to form at least one core stock element.

FIG. 15 illustrates the combined multiple layered composite billet and sheathing covering being successively or gang cut at spaced intervals along cut lines 143 as described above to form one or more core stock elements 144.

Figure 16:
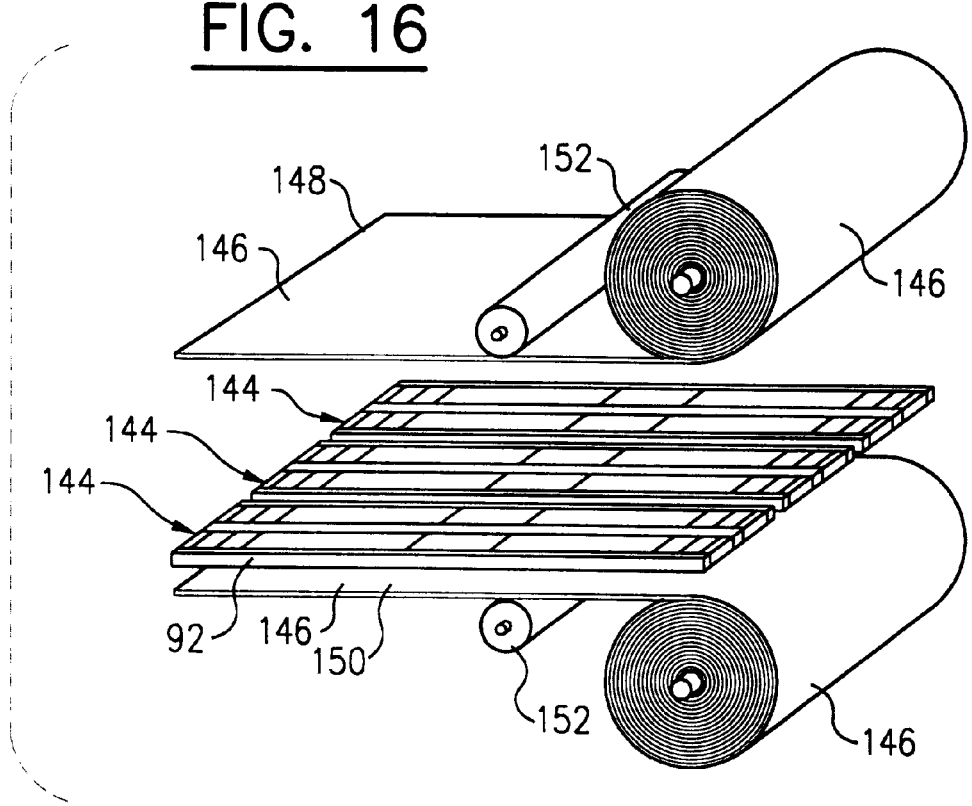
FIG. 16 is an isometric, schematic, exploded view of a plurality of core stock elements shown in FIG. 15 placed in spaced orientation one to another, having additional sheathing in the form of a first core cover sheet and a second core cover sheet juxtaposed against and joined to the core stock elements, and then being passed through the throat of a pinch press.
Figure 17:
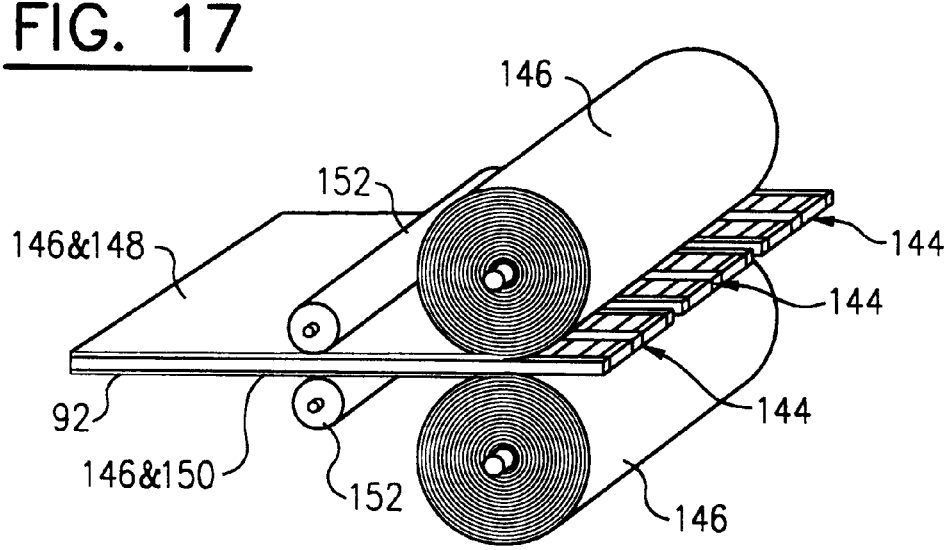
FIG. 17 is an isometric, schematic view as shown in FIG. 16, but not with an exploded perspective.

FIGS. 16 and 17 illustrate a plurality of core stock elements 144 placed in spaced orientation one to another, having additional sheathing 146, in the form of a first core cover sheet 148 and a second core cover sheet 150, juxtaposed against and joined to the core stock elements 144.

The combined core stock elements 144 and joined sheathing 146 material, and more particularly the first and second core cover sheets 148 and 150, are preferably passed through the throat of a pinch press 152.

FIG. 18 illustrates slices of the multiple layered composite billet 140 further encased or encapsulated within the sheathing 146 such that the interior foam segments are not observable or exposed. The sheathing 146 is then cut or separated along cut lines 154 to separate the multiple layered composite billet 140 into a plurality of composite products 156.

FIG. 19 illustrates the resulting composite product 156 that can be used as a component part of a door jamb.

The means and construction disclosed herein are by way of example and comprise primarily the preferred form of putting the invention into effect. Although the drawings depict the preferred embodiment of the invention, other embodiments have been described within the preceding text. One skilled in the art will appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

INDUSTRIAL APPLICABILITY

The present invention may be used within nearly any industry that relies heavily upon the supply and/or use of solid wood products. For example, but not by way of limitation, the present invention may be used to manufacture and construct homes, doors, door jambs, window frames, window jambs, cabinetry, furniture, decks, fences, and the like. In essence, it is conceivable that the composite products of the present invention could replace nearly all decorative and/or structural lumber products.

The apparatus and processes of the present invention are relatively simple, reliable, and can be easily modified for nearly any desirable application.

The composite products created using this invention are easily constructed, energy efficient, durable, rugged, and inexpensive and economical to manufacture. Traditional or nontraditional, conventional or nonconventional means for constructing homes, furniture, cabinetry, etc., may be used.

When a high-quality wood exterior is desired, the present invention significantly reduces the amount of expensive, high-quality wood that would otherwise be required to manufacture a similarly dimensioned item.

The composite products may be further machined, painted, stained, nailed, and glued, in a very similar manner as their milled solid wood counterparts.

The present invention also increases the energy efficiency of composite products as compared to comparable solid wood products.

What is claimed is:

1. A process for manufacturing a composite product, said process comprising the steps of:
    (a) obtaining a supply of appropriately dimensioned stock segments, foam segments, and sheathing material;
    (b) juxtaposing and joining selected stock segments and foam segments in predetermined alternating layers to form at least one composite billet;
    (c) applying and joining the sheathing material to opposed surfaces or sides of the composite billet;
    (d) cutting the composite billet generally transversely across the joint lines between the stock segments and foam segments to form at least one core stock element having a cut face; and
    (e) applying and joining additional sheathing material directly onto the cut face of the core stock element to encapsulate the foam segments therein and thereby form the composite product.

2. A process for manufacturing a composite product, said process comprising the steps of:
    (a) obtaining a plurality of stock segments, each of the stock segments having a predetermined width, length, and common thickness;
    (b) obtaining a plurality of foam segments, each of the foam segments having a predetermined width, length, and common thickness;
    (c) juxtaposing and joining selected stock segments and selected foam segments in predetermined alternating layers to form at least one composite billet, the stock segments and the foam segments having a common generally uniform thickness, the composite billet having a first surface, an opposed second surface, a first side, a second side, a leading edge, and a trailing edge;
    (d) juxtaposing and joining a first cover sheet to the first surface of the composite billet;
    (e) juxtaposing and joining a second cover sheet to the second surface of the composite billet;
    (f) cutting the composite billet generally transversely across the joint lines between the stock segments and the foam segments to form at least one core stock element, the core stock element having a first surface, an opposed second surface, a first side, a second side, a leading edge, and a trailing edge wherein said first surface of the core stock element is a cut surface;
    (g) juxtaposing and joining a first core cover sheet directly onto the first surface of the core stock element; and
    (h) juxtaposing and joining a second core cover sheet to the second surface of the core stock element, thereby creating the composite product.

3. The process of claim 2, wherein said step of obtaining a plurality of stock segments further comprises the step of cutting plywood, fiberboard, pressboard, resin impregnated paper, compressed cardboard, plastic, concrete, fiberglass, or metal to form the plurality of stock segments.

4. The process of claim 3, where said step of obtaining a plurality of stock segments further comprises the steps of:
(a) cutting segments of plywood, fiberboard, pressboard, resin impregnated paper, compressed cardboard, plastic, concrete, fiberglass, or metal to a predetermined generally uniform thickness;
(b) juxtaposing the segments of plywood, fiberboard, pressboard, resin impregnated paper, compressed cardboard, plastic, concrete, fiberglass, or metal to have a common uniform thickness;
(c) joining the segments of plywood, fiberboard, pressboard, resin impregnated paper, compressed cardboard, plastic, concrete, fiberglass, or metal to form a block with a predetermined generally uniform thickness; and
(d) cutting the block to form the plurality of stock segments.

5. The process of claim 2, wherein said step of obtaining a plurality of foam segments further comprises the step of cutting foam from at least one sheet or billet of foam to form the plurality of foam segments.

6. The process of claim 5, wherein said step of obtaining a plurality of foam segments further comprises the steps of:
(a) stacking and joining a plurality of sheets of foam to form a billet of foam;
(b) cutting the billet of foam generally transversely to the joint lines between successive sheets of the stacked foam to form at least one sheet of stacked or layered foam having a predetermined generally uniform thickness;
(c) cutting the sheet of stacked or layered foam to form the plurality of foam segments.

7. The process of claim 6, wherein said step of cutting the sheet of stacked or layered foam to form the plurality of foam segment further comprises the step of cutting the sheet of stacked or layered foam generally transverse to the joint lines between successive sheets of stacked or layered foam.

8. The process of claim 2, wherein said step of juxtaposing and joining selected stock segments and selected foam segments in predetermined alternating layers further comprises the steps of:
(a) placing a first stock segment having a width, length, and thickness against a support surface, the thickness of the first stock segment extending outwardly from the support surface;
(b) placing a first foam segment having a width, length, and thickness against the support surface and against the first stock segment, the alignment of the length of the first foam segment being similar to the alignment of the length of the first stock segment;
(c) joining the first stock segment to the first foam segment;
(d) placing a second stock segment having a width, length, and thickness against the support surface and against the first foam segment, the alignment of the length of the second stock segment being similar to the alignment of the length of the first foam segment;
(e) joining the first foam segment to the second stock segment;
(f) placing a second foam segment having a width, length, and thickness against the support surface and against the second stock segment, the alignment of the length of the second foam segment being similar to the alignment of the length of the second stock segment;
(g) joining the second stock segment to the second foam segment;
(h) placing a third stock segment having a width, length, and thickness against the support surface and against the second foam segment, the alignment of the length of the third stock segment being similar to the alignment of the length of the second foam segment;
(i) joining the second foam segment to the third stock segment;
(j) placing a third foam segment having a width, length, and thickness against the support surface and against the third stock segment, the alignment of the length of the third foam segment being similar to the alignment of the length of the third stock segment;
(k) joining the third stock segment to the third foam segment;
(l) placing a fourth stock segment having a width, length, and thickness against the support surface and against the third foam segment, the alignment of the length of the fourth stock segment being similar to the alignment of the length of the third foam segment; and
(m) joining the third foam segment to the fourth stock segment.

9. The process of claim 8, wherein the first stock segment, first foam segment, second stock segment, second foam segment, third stock segment, third foam segment, and forth stock segment have a length of about four feet.

10. The process of claim 8, further comprising the steps of:
(a) placing a fourth foam segment having a width, length, and thickness against the support surface and against the fourth stock segment, the alignment of the length of the fourth foam segment being similar to the alignment of the length of the fourth stock segment;
(b) joining the fourth stock segment to the fourth foam segment;
(c) placing a fifth stock segment having a width, length, and thickness against the support surface and against the fourth foam segment, the alignment of the length of the fifth stock segment being similar to the alignment of the length of the fourth foam segment; and
(d) joining the fourth foam segment to the fifth stock segment.

11. The process of claim 2, further comprising the step of surface sanding the first surface of the composite billet prior to juxtaposing and joining the first cover sheet to the first surface of the composite billet.

12. The process of claim 2, further comprising the step of surface sanding the second surface of the composite billet prior to juxtaposing and joining the second cover sheet to the second surface of the composite billet.

13. The process of claim 2, further comprising the step of passing the billet through a throat of a pinch press after the first cover sheet is juxtaposed upon the first side of the composite billet and the second cover sheet is juxtaposed upon the second side of the composite billet.

14. The process of claim 2, further comprising the steps of:
(a) juxtaposing and joining a third cover sheet to the exterior surface or face of the first cover sheet of the composite billet; and
(b) juxtaposing and joining a fourth cover sheet to the exterior surface or face of the second cover sheet of the composite billet.

15. The process of claim 2, further comprising he step of surface sanding the first surface of the core tock element prior to juxtaposing and joining the first core cover sheet to the first surface of the core stock element.

16. The process of claim 2, further comprising the step of surface sanding the second surface of the core stock element prior to juxtaposing and joining the second core cover sheet to the second surface of the core stock element.

17. The process of claim 2, further comprising the step of passing the core stock element through a throat of a pinch press after the first core cover sheet is juxtaposed upon the first surface of the core stock element and the second core cover sheet is juxtaposed upon the second surface of the core stock element.

18. The process of claim 2, wherein said step of cutting the composite billet to form at least one core stock element further comprises the step of cutting a plurality of core stock elements from the composite billet, each of the core stock elements having a predetermined width, length, and thickness, juxtaposing the plurality of core stock elements in spaced, generally parallel orientation one to another.

19. The process of claim 18, wherein said steps of juxtaposing and joining the first core cover sheet to the first surface of the core stock element and juxtaposing and joining the second core cover sheet to the second surface of the core stock element further comprises the step of juxtaposing and joining the first core cover sheet to each first surface of the plurality of core stock elements and juxtaposing and joining the second core cover sheet to each second surface of the plurality of core stock elements.

20. The process of claim 18, further comprising the step of passing the core stock element through a throat of a pinch press after the first core cover sheet is juxtaposed upon the first surface of the core stock element and the second core cover sheet is juxtaposed upon the second surface of the core cover sheet.

21. The process of claim 19, further comprising the step of cutting the first core cover sheet and the second core cover sheet along the spaces located between adjacent core stock elements to separate and form a plurality of the composite products.

22. The process of claim 2, further comprising the step of laminating an exterior veneer or solid wood member to the composite product.

23. A process for manufacturing a composite product, said process comprising the steps of:
   (a) obtaining a plurality of stock segments, each of the stock segments having a predetermined width, length and common thickness;
   (b) obtaining a plurality of foam segments, each of the foam segments having a predetermined width, length, and common thickness,
   (c) juxtaposing and joining selected stock segments and selected foam segments in predetermined alternating layers to form at least one composite billet, the stock segments and the foam segments having a common generally uniform thickness, the composite billet having a first surface, an opposed second surface, a first side, a second side, a leading edge, and a trailing edge, said step of juxtaposing and joining selected stock segments and selected foam segments in predetermined alternating layers further comprising the steps of
      (i) placing a first stock segment having a width, length, and thickness against a support surface, the thickness of the first stock segment extending outwardly from the support surface,
      (ii) placing a first foam segment having a width, length, and thickness against the support surface and against the first stock segment, the alignment of the length of the first foam segment being similar to the alignment of the length of the first stock segment,
      (iii) joining the first stock segment to the first foam segment,
      (iv) placing a second stock segment having a width, length, and thickness against the support surface and against the first foam segment, the alignment of the length of the second stock segment being similar to the alignment of the length of the first foam segment,
      (v) joining the first foam segment to the second stock segment,
      (vi) placing a second foam segment having a width, length, and thickness against the support surface and against the second stock segment, the alignment of the length of the second foam segment being similar to the alignment of the length of the second stock segment,
      (vii) joining the second stock segment to the second foam segment,
      (viii) placing a third stock segment having a width, length, and thickness against the support surface and against the second foam segment, the alignment of the length of the third stock segment being similar to the alignment of the length of the second foam segment,
      (ix) joining the second foam segment to the third stock segment,
      (x) placing a third foam segment having a width, length, and thickness against the support surface and against the third stock segment, the alignment of the length of the third foam segment being similar to the alignment of the length of the third stock segment,
      (xi) joining the third stock segment to the third foam segment,
      (xii) placing a fourth stock segment having a width, length, and thickness against the support surface and against the third foam segment, the alignment of the length of the fourth stock segment being similar to the alignment of the length of the third foam segment,
      (xiii) joining the third foam segment to the fourth stock segment;
   (d) juxtaposing and joining a first cover sheet to the first surface of the composite billet;
   (e) juxtaposing and joining a second cover sheet to the second surface of the composite billet;
   (f) cutting the composite billet generally transversely to the joint lines between the stock segments and the foam segments to form at least one core stock element, the core stock element having a first surface, an opposed second surface, a first side, a second side, a leading edge, and a trailing edge;
   (g) juxtaposing and joining a first core cover sheet to the first surface of the core stock element, and
   (h) juxtaposing and joining a second core cover sheet to the second surface of the core stock element, thereby creating the composite product, the first stock segment having a width of about eight inches, the first foam segment having a width of about twenty-two and one half inches, the second stock segment having a width of about eleven inches, the second foam segment having a width of about nineteen and one half inches, the third stock segment having a width of about four inches, the third foam segment having a width of about nine inches, and the fourth stock segment having a width of about four or more inches.

24. A process for manufacturing a composite product, said process comprising the steps of:
- (a) obtaining a plurality of stock segments, each of the stock segments having a predetermined width, length, and common thickness,
- (b) obtaining a plurality of foam segments, each of the foam segments having a predetermined width, length, and common thickness,
- (c) juxtaposing and joining selected stock segments and selected foam segments in predetermined alternating layers to form at least one composite billet, the stock segments and the foam segments having a common generally uniform thickness, the composite billet having a first surface, an opposed second surface, a first side, a second side, a leading edge, and a trailing edge, said step of juxtaposing and joining selected stock segments and selected foam segments in predetermined alternating layers further comprises the steps of
  - (i) placing a first stock segment having a width, length, and thickness against a support surface, the thickness of the first stock segment extending outwardly from the support surface,
  - (ii) placing a first foam segment having a width, length, and thickness against the support surface and against the first stock segment, the alignment of the length of the first foam segment being similar to the alignment of the length of the first stock segment,
  - (iii) joining the first stock segment to the first foam segment,
  - (iv) placing a second stock segment having a width, length, and thickness against the support surface and against the first foam segment, the alignment of the length of the second stock segment being similar to the alignment of the length of the first foam segment,
  - (v) joining the first foam segment to the second stock segment,
  - (vi) placing a second foam segment having a width, length, and thickness against the support surface and against the second stock segment, the alignment of the length of the second foam segment being similar to the alignment of the length of the second stock segment,
  - (vii) joining the second stock segment to the second foam segment,
  - (viii) placing a third stock segment having a width, length, and thickness against the support surface and against the second foam segment, the alignment of the length of the third stock segment being similar to the alignment of the length of the second foam segment,
  - (ix) joining the second foam segment to the third stock segment,
  - (x) placing a third foam segment having a width, length, and thickness against the support surface and against the third stock segment, the alignment of the length of the third foam segment being similar to the alignment of the length of the third stock segment,
  - (xi) joining the third stock segment to the third foam segment,
  - (xii) placing a fourth stock segment having a width, length, and thickness against the support surface and against the third foam segment, the alignment of the length of the fourth stock segment being similar to the alignment of the length of the third foam segment,
  - (xiii) joining the third foam segment to the fourth stock segment,
  - (xiv) placing a fourth foam segment having a width, length, and thickness against the support surface and against the fourth stock segment, the alignment of the length of the fourth foam segment being similar to the alignment of the length of the fourth stock segment,
  - (xv) joining the fourth stock segment to the fourth foam segment,
  - (xvi) placing a fifth stock segment having a width, length, and thickness against the support surface and against the fourth foam segment, the alignment of the length of the fifth stock segment being similar to the alignment of the length of the fourth foam segment,
  - (xvii) joining the fourth foam segment to the fifth stock segment,
- (d) juxtaposing and joining a first cover sheet to the first surface of the composite billet;
- (e) juxtaposing and joining a second cover sheet to the second surface of the composite billet;
- (f) cutting the composite billet generally transversely to the joint lines between the stock segments and the foam segments to form at least one core stock element, the core stock element having a first surface, an opposed second surface, a first side, a second side, a leading edge, and a trailing edge;
- (g) juxtaposing and joining a first core cover sheet to the first surface of the core stock element, and
- (h) juxtaposing and joining a second core cover sheet to the second surface of the core stock element, thereby creating the composite product, the first stock segment having a width of about two and one half inches, the first foam segment having a width of about five inches, the second stock segment having a width of about six inches, the second foam segment having a width of about twenty two and one quarter inches, the third stock segment having a width of about eleven and one half inches, the third foam segment having a width of about twenty two and one quarter inches, the fourth stock segment having a width of about six inches, the fourth foam segment having a width of about five inches, and the fifth stock segment having a width of about two and one half or more inches.

* * * * *